US008602511B2

(12) United States Patent
Ktami et al.

(10) Patent No.: US 8,602,511 B2
(45) Date of Patent: Dec. 10, 2013

(54) GENERATOR SET WITH REMOVABLE PANELS AND CAPTIVE BOLT SYSTEM

(75) Inventors: Nader W. Ktami, Griffin, GA (US); Gareth Campbell, Crumlin (GB); Ian D. Henderson, Larne (GB)

(73) Assignee: Caterpillar Inc., Peoria, IL (US)

( * ) Notice: Subject to any disclaimer, the term of this patent is extended or adjusted under 35 U.S.C. 154(b) by 352 days.

(21) Appl. No.: 13/023,636

(22) Filed: Feb. 9, 2011

(65) Prior Publication Data

US 2011/0198860 A1   Aug. 18, 2011

Related U.S. Application Data

(60) Provisional application No. 61/304,511, filed on Feb. 15, 2010.

(51) Int. Cl.
*A47B 47/03* (2006.01)

(52) U.S. Cl.
USPC .......................................... 312/265.6; 123/2

(58) Field of Classification Search
USPC ........ 312/257.1, 265.5, 265.6, 100; D13/122; 123/2, 1 R; 290/1 A, 1 B, 1 R
See application file for complete search history.

(56) References Cited

U.S. PATENT DOCUMENTS

| 3,727,660 | A | | 4/1973 | Burge | |
|---|---|---|---|---|---|
| 3,768,064 | A | * | 10/1973 | Pabich | 439/370 |
| 3,835,795 | A | * | 9/1974 | Levenberg | 108/153.1 |
| 4,226,214 | A | * | 10/1980 | Palazzetti | 123/2 |
| 4,307,588 | A | * | 12/1981 | Smith et al. | 68/23.7 |
| 4,495,901 | A | * | 1/1985 | Nannini et al. | 123/2 |
| 4,622,923 | A | * | 11/1986 | Nishimura et al. | 123/2 |
| 4,680,828 | A | * | 7/1987 | Cook et al. | 16/90 |
| 4,858,878 | A | * | 8/1989 | Gassaway | 248/551 |
| 5,006,025 | A | | 4/1991 | Duran | |
| 5,093,759 | A | * | 3/1992 | Davis et al. | 361/721 |
| 5,584,549 | A | * | 12/1996 | Lybarger et al. | 312/265 |
| 5,601,317 | A | | 2/1997 | Crouse et al. | |
| 6,041,536 | A | | 3/2000 | Samuels et al. | |
| 6,941,469 | B2 | | 9/2005 | Beuchat et al. | |
| 7,396,210 | B2 | | 7/2008 | Bucher et al. | |
| 2003/0222552 | A1 | * | 12/2003 | Wessel | 312/278 |
| 2008/0245599 | A1 | | 10/2008 | Batdorff et al. | |

* cited by examiner

*Primary Examiner* — James O Hansen
(74) *Attorney, Agent, or Firm* — Liell & McNeil

(57) ABSTRACT

A method of retrofitting a generator set includes disconnecting a removable panel from a frame of a generator set housing. In order to accomplish this, short bolts associated with the removable panel are disconnected from nutserts that are permanently affixed to the frame. A removable panel compliance kit is installed to the generator set frame by threading long bolts through the nutserts and then attaching a pair of nuts in a locking configuration on each of the long bolts. The removable panel, which is modified to include keyhole shaped bolt openings, is then reconnected to the frame by advancing the long bolts further into the respective nutserts.

4 Claims, 3 Drawing Sheets

GENERATOR SET WITH REMOVABLE PANELS AND CAPTIVE BOLT SYSTEM

RELATION TO OTHER APPLICATION

This application claims priority to provisional application 61/304,511, filed Feb. 15, 2010 with the same title.

TECHNICAL FIELD

The present disclosure relates generally to generator sets with removable panels that are attachable with a captive bolt system, and more particularly to a retrofit compliance kit for converting generator sets to include captive bolt systems for their removable panels.

BACKGROUND

Generator sets have long been known in the art and typically include a housing to which one or more removable panels are attached. When a component within the generator set housing is in need of servicing and/or inspection, the panel may be detached from the housing to facilitate the servicing/inspection operation. Thereafter, the panel may be reattached to the frame of the generator set housing. In many cases, these removable panels are attached to the frame of the housing using simple bolts that are mated to nutserts that are permanently affixed to the frame of the generator set housing. As such, the bolts must be completely detached from the underlying frame in order to remove the particular panel. In some instances, the bolts may become lost, and often not replaced, leading to removable panels that are less than securely reattached to the underlying frame of the generator set housing.

In some jurisdictions, regulations may require that some removable panels for generator sets be attached with captive fasteners that either remain connected to the generator set housing or to the removable panel when the panel is detached from the housing for a servicing and/or inspection operation. In some instances, these captive fastener requirements may be applied retroactively to older generator sets already in the field that are not yet in compliance with the new regulation. Generator sets are often large stationary machines that can not be readily moved to a convenient location to undergo a retrofitting operation to be made compliant with captive fastener regulations. Thus, the owners of these existing generator sets may be left in an awkward problematic position in bringing their generator sets into compliance with captive fastener regulations. One such regulation may be the European Union Machinery Safety Directive (1.4.2.1) that governs the removal and attachment of removable panels for certain machines.

The present disclosure is directed toward overcoming one or more of the problems set forth above.

SUMMARY

In one aspect, a method of retrofitting a generator set includes a step of disconnecting a removable panel from a frame of the generator set housing. In order to accomplish this, short bolts associated with the removable panel are disconnected from nutserts permanently affixed to the frame. A removable panel compliance kit is then installed to the generator set frame. The installation includes threading long bolts through the nutserts and then attaching a pair of nuts in a locking configuration on each of the long bolts. The removable panel or a substitute panel is then connected to the frame, which includes advancing the long bolts further into the nutserts.

In another aspect, a generator set has a housing that includes a frame and a plurality of attached panels. At least one of the panels is a removable panel connected to a plurality of nutserts that are permanently affixed to the frame. At least one component is mounted in the generator set housing and is accessible when the removable panel is disconnected from the frame. A removable panel compliance kit is installed to the generator set housing. The installation includes a number of bolts captured in respective ones of the nutserts by a pair of nuts in a locking configuration.

In still another aspect, a removable panel compliance kit inhibits disconnection of bolts associated with a removable panel from nutserts permanently affixed to a frame of a generator set housing. The kit includes a number of long bolts for substitution in place of short bolts previously threaded to nutserts that are permanently affixed to a frame of the generator set housing. The long bolts have a threaded shaft substantially longer than a threaded length of the nutserts, and the long bolts have threads that match the nutserts. A pair of nuts are provided for each of the long bolts and are threadably attachable to a respective long bolt in a locking configuration when the long bolt is threaded through the respective nutsert.

DETAILED DESCRIPTION

Figure 1:
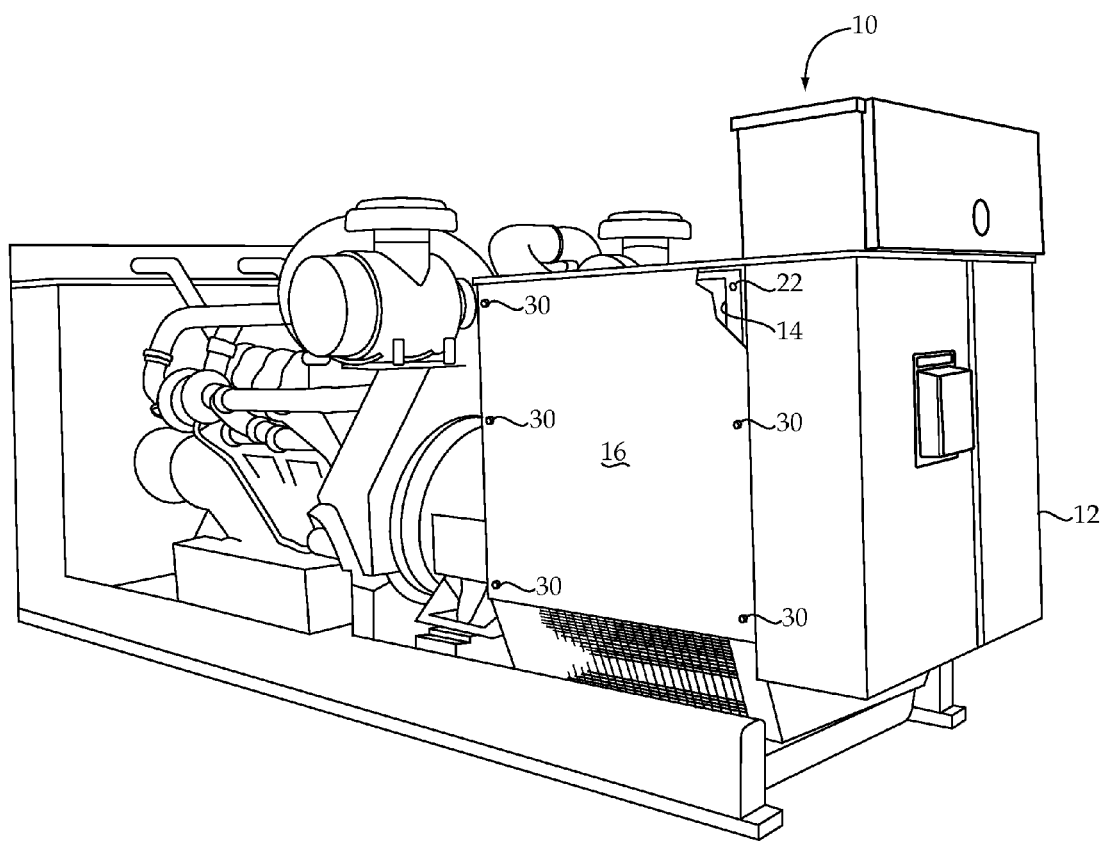
FIG. 1 is a perspective view of a generator set according to one aspect of the present disclosure.
Figure 2:
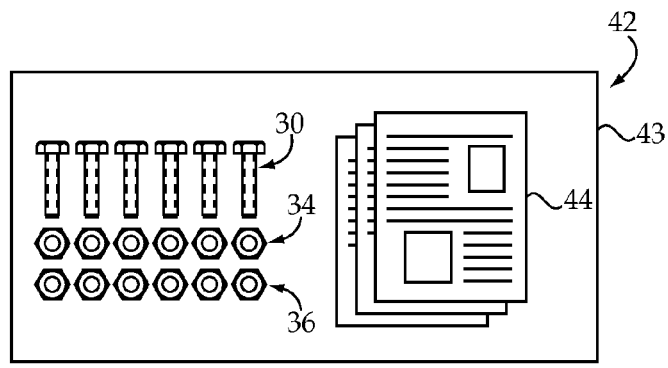
FIG. 2 is a schematic view of a removable panel compliance kit according to the present disclosure.

Referring to FIGS. 1 and 2, a generator set of the type manufactured by Caterpillar Inc. of Peoria Ill. includes a housing 12 that protects some of the components from the elements in the field. Housing 12 includes a frame 14 to which a plurality of panels are attached. Among the panels are removable panels 16 (only one of which is shown) that flank opposite sides of the generator 11. Panels 16 are made removable so that certain components, such as generator bearings, exitors and some controls may be accessed for servicing and/or inspection. Removable panel 16 is connected to underlying frame 14 via bolts 30 that are threadably received in nutserts 22, which are permanently affixed to frame 14. For instance, nutserts 22 may comprise internally threaded fasteners attached to frame 14 in a conventional manner, such as via a rivet type attachment. Generator set 10 is shown after installation of a removable panel compliance kit 42 of the type illustrated for example in FIG. 2. Prior to installation of kit 42, panels 16 were connected to frame 14 via short bolts 20 (FIG. 5), which required the short bolts to be completely detached from nutserts 22 before panel 16 could be disconnected from housing 12. With the installation of removable panel compliance kit 42, the fasteners (bolts 30) associated with removable panel 16 remain captive to frame 14 at all times, including when panel 16 is disconnected from housing 12.

Referring now specifically to FIG. 2, each removable panel compliance kit 42 may include a number of long bolts 30 and a pair of nuts 34 and 36 for each of the bolts. In the illustrated example, six long bolts 30 (equal in number to six short bolts 20 to be replaced) and twelve nuts 34 and 36 are provided in a container 43 along with a set of instructions for use 44. Those skilled in the art will appreciate that the example illustrated kit 42 shown in FIG. 2 relates to a single panel 16 for the generator set 10 illustrated in FIG. 1. In other words, removable panel 16 is attached with six bolts, but those skilled in the art will appreciate that the kit can be scaled for any number of required bolts and/or include fasteners necessary for retrofitting more than one panel on an individual generator set without departing from the intended scope of the present disclosure. Preferably, long bolts 30 as well as nuts 34 and 36 are drawn from a preexisting parts catalog of the generator set manufacturer so that a retrofit kit 42 can be assembled from existing parts, and replacement pieces may also be readily available both to end users and dealers alike. In the context of this disclosure, preexisting means that the long bolts 30 and nuts 34 and 36 already were among parts listed, numbered and organized by the generator set manufacturer prior to promulgation of any regulation that may have required captive bolt systems for removable panels of the type discussed in this disclosure. Long bolts 30, nuts 34 and 36 and nutserts 22 have matching thread patterns.

Figure 3:
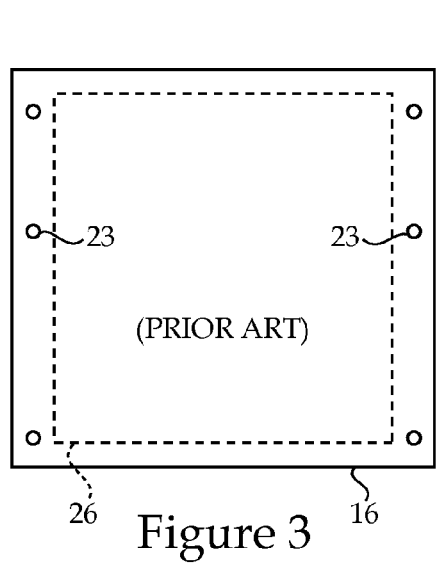
FIG. 3 is a front view of a prior art removable panel.
Figure 4:
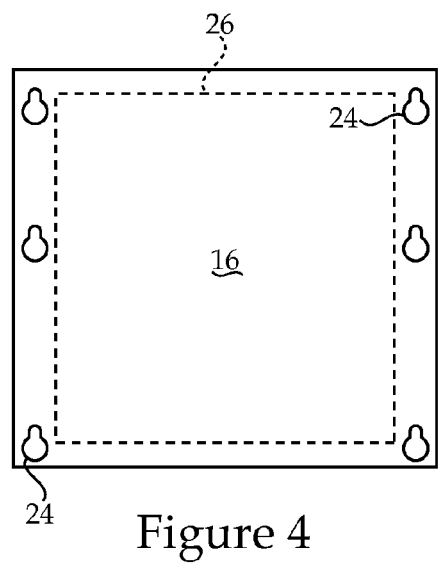
FIG. 4 is a front view of a removable panel according to the present disclosure.

Referring now to FIGS. 3 and 4, removable panel 16 may need to be modified as part of a process for retrofitting generator set 10. For instance, panel 16 may have been initially provided with round bolt holes 23 as shown in FIG. 3 but opening 23 may be re-shaped into keyhole shaped openings 24 of the type shown in FIG. 4. Also shown in FIGS. 3 and 4 in shadow is a seal 26 that may be included on the interior surface of panel 16 so that when the panel is attached to frame 14, debris, dust and water are further prevented from entry into housing 12. The round hole openings 23 may be converted from key hole shaped openings 24 in any suitable manner. For instance, the end user may have a punch that would allow the openings to be reshaped. Alternatively, a dealer may have a machine shop for reshaping the openings into key hole shape 24. In this later example, an end user may simply exchange their prior art panel 16 of the type shown in FIG. 3 for a substitute panel 16 of the type shown in FIG. 4, and the dealer may then modify the exchanged panel to include key shaped openings 24 for exchange with a subsequent customer. In still another possibility, a substitute panel of the type shown in FIG. 4 may be included as part of retrofit kit 42 of the type shown in FIG. 2 without departing from the present disclosure. The enlarged portion of keyhole shaped openings 24 should be large enough to accommodate the heads 32 (FIG. 5) of long bolts 30 and the smaller diameter portion of the keyhole shaped opening should be sized to accommodate to receive the shaft 31 (FIG. 5) of individual long bolts 30.

Figure 5:
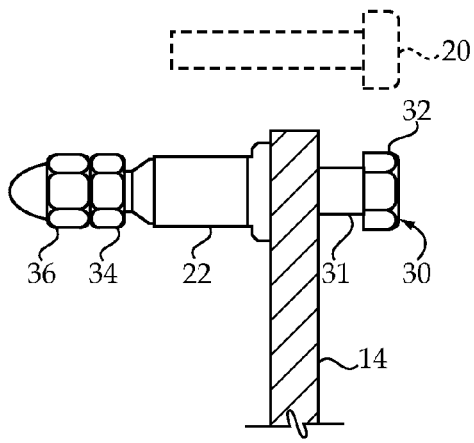
FIG. 5 is a side sectioned view of a portion of the generator set housing of FIG. 1 after installation of a removable panel compliance kit.
Figure 6:
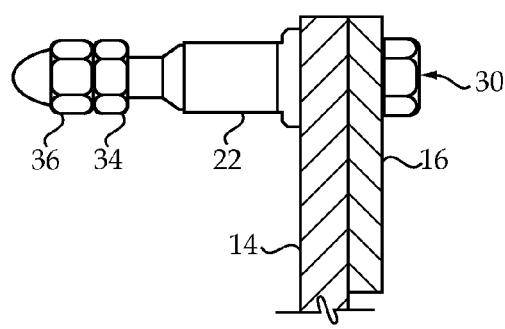
FIG. 6 is a view similar to FIG. 5 except after the removable panel has been reattached to the frame of the generator set housing.

Referring now to FIGS. 5 and 6, the process of retrofitting generator set 10 may begin by disconnecting the existing panel 16 from housing 12. This would be accomplished by completely disconnecting the existing short bolts 20 from their respective nutserts 22. Next, a respective long bolt 30 is threaded through a respective nutsert 22 so that an exposed threaded end of shaft 31 protrudes out an opposite end of nutsert 22. Thus, the threaded shaft 31 of long bolt 30 is substantially longer than a threaded length of the respective nutsert 22. Next, a first nut 34 is threaded onto the end of long bolt 30 followed by a second nut 36. Second nut 36 is threaded to abut first nut 34 so that they assume a locking configuration of a type well known in the art. In other words, after achieving the locking configuration shown in FIGS. 5 and 6, one would be unable to detach long bolts 30 from their respective nutserts 22 simply by attempting to unthread the bolt 30 from the nutsert 22. Although not necessary, first nut 34 and second nut 36 may be different from each other. For instance, in the illustrated embodiments, the first nut 34 is a conventional nut, whereas the second nut 36 includes a rounded cap feature that may be included to cover and prevent potential damage or interaction with exposed sharp threads at the end of long bolt 30. Those skilled in the art will appreciate that the threaded shaft 31 of long bolts 30 is sufficiently long that a gap between head 32 and frame 14, when nuts 34 and 36 are in a locking configuration and nut 34 contacts nutsert 22, is greater than a thickness of removable panel 16 so that the panel can be removed and reconnected to frame 14 while the respective long bolts 30 remain captive in their respective nutserts 22. While the long bolts 30 and their associated pair of nuts 34 and 36 are attached to the respective nutserts 22, the originally removed panel may be modified as discussed in relation to FIGS. 3 and 4. Alternatively, a substitute panel that includes keyhole shaped openings may be utilized. The panels 16 with keyhole shaped openings 24 receive the heads 32 of long bolts 30 through the larger portion of the keyhole shaped openings and then the panel is lowered onto the smaller portion of the keyhole shaped openings in to contact with shaft 31. The panel 16 may then be secured to the housing 12 by further advancing long bolts 30 into the respective nutserts 22 so that nut 34 moves farther away from its associated nutsert 22.

Figure 9:
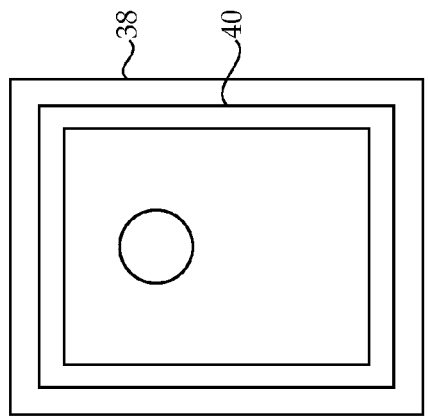
FIG. 9 is a front view of a cover plate shown in FIGS. 7 and 8.
Figure 8:
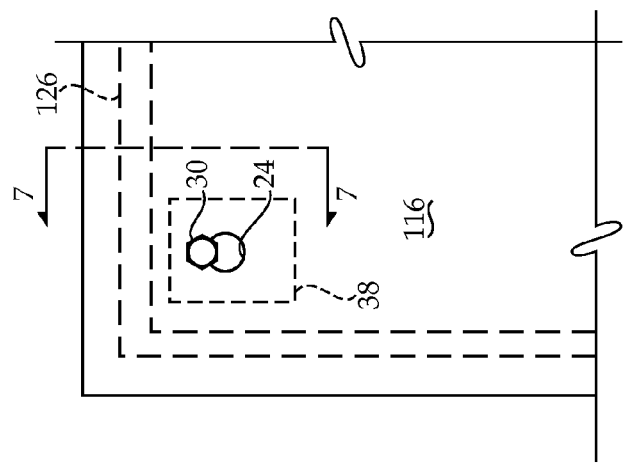
FIG. 8 is a front view of a portion of the panel shown in FIG. 7.
Figure 7:
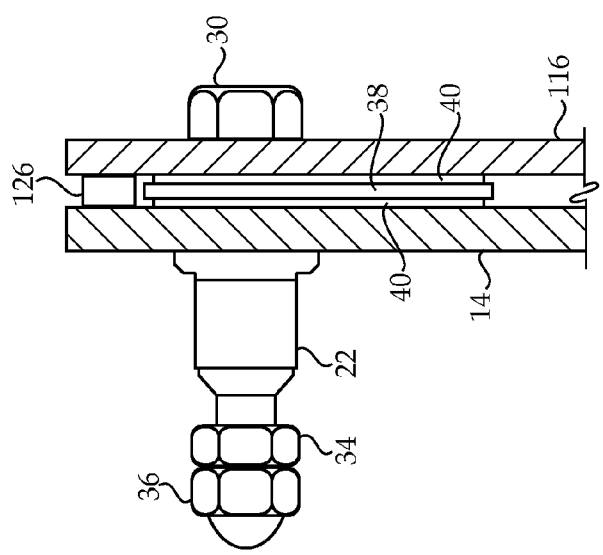
FIG. 7 is a sectioned side view of an installed removable panel compliance kit according to another aspect of the present disclosure.

Referring now to FIGS. 7, 8 and 9, an alternative embodiment of the present disclosure is illustrated in those instances when there is a need to seal the larger portion of the keyhole shaped opening 24 so that debris, dust and/or water cannot enter housing 12 after a panel 116 has been resecured to the generator set housing. For instance, in those instances where an outboard seal 126 may be included on panel 116, the utilization of keyhole shaped openings 24 will leave a crescent shaped access of the type shown in FIG. 8 after the panel 116 is secured in place. This possibility may be accommodated by including cover plates 38 for each of the affected keyhole shaped openings 24 that need to be closed against entry of debris. Whether an individual opening may or may not need a cover plate 38 may be dependent upon where the panel 116 touches the underlying frame of the generator set 10 as well as where the location of any existing seal 126 is relative to the end location of long bolts 30 when panel 116 is secured to the frame 14 as shown in FIG. 8. Each cover plate 38 may include a piece of plate, such as sheet metal that includes a round bolt opening sized to accommodate the shaft 31 of a respective long bolt 30, and may include conventional seal material 40 attached to opposite sides of the plate in a manner that surrounds opening 39. Those skilled in the art will recognize that cover plates 38 remain captive once installed as shown. In addition, the seal 40 may also be positioned to form a contact seal with the frame 14 on one side, and with the panel 116 on its opposite side as best shown in FIG. 7.

INDUSTRIAL APPLICABILITY

The present disclosure may be generally applicable to any machine that includes a housing with removable panels, when there is need or requirement that fasteners associated with the removable panel be captive. The present disclosure finds particular application in relation to generator sets that include components located within a housing 12 that may be in need of periodic inspection and/or servicing. In addition, the present disclosure finds specific applicability to generator sets in jurisdictions where there may be a need or requirement for fasteners associated with a removable panel to remain captive to order to avoid losing the fasteners when the servicing or inspection operation is performed in the field. Although the present disclosure is illustrated in the context of retrofitting a generator set, those skilled in the art will appreciate that new models of a generator set may be manufactured with the removable panel compliance kit already incorporated therein, especially in those cases where the retrofit kit parts (bolts 30, nuts 34 and nuts 36) are drawn from a preexisting parts catalog.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A generator set comprising:
   a generator set housing that includes a frame and a plurality of attached panels, and at least one of the panels being a removable panel removably connected to a plurality of nutserts permanently affixed to the frame;
   at least one component of the generator set housing being accessible when the panel is disconnected from the frame;
   a removable panel compliance kit installed to the generator set housing, and including a number of bolts captured in respective ones of the nutserts by a pair of nuts in a locking configuration;
   wherein a gap between a head of a respective one of the bolts and a panel contact surface of the generator set housing is greater than thickness of the removable panel when one of the pair of nuts is in contact with the respective nutsert; and
   the one of the pair of nuts is out of contact with the respective nutsert when the panel is secured to the frame of the generator set housing.

2. The generator set of claim 1 including a cover plate mounted on at least one of the bolts between the removable panel and the frame.

3. The generator set of claim 1 wherein each of the bolts is received through a key shaped opening in the removable panel, when the removable panel is connected to the frame.

4. The generator set of claim 3 wherein each of the pair of nuts includes a first nut and a second nut that is different from the first nut.

* * * * *